United States Patent [19]

Crandall et al.

[11] 4,048,620
[45] Sept. 13, 1977

[54] CENTRAL STATION TO ADDRESSED POINT COMMUNICATION SYSTEM

[75] Inventors: Richard E. Crandall; Denny E. Morgan, both of Cambridge, Mass.

[73] Assignee: Kinney Safety Systems, Inc., New York, N.Y.

[21] Appl. No.: 511,109

[22] Filed: Oct. 2, 1974

[51] Int. Cl.² .............................................. H04Q 9/00
[52] U.S. Cl. .................................. 340/163; 340/151; 340/152 R
[58] Field of Search ............... 340/152 T, 152 R, 163, 340/151, 408, 146.1 C; 179/2 DP

[56] References Cited

U.S. PATENT DOCUMENTS

| | | | |
|---|---|---|---|
| 3,413,606 | 11/1968 | Chicanowicz | 340/163 |
| 3,541,513 | 11/1970 | Paterson | 340/151 |
| 3,551,885 | 12/1970 | Henzel | 340/146.1 C |
| 3,593,293 | 7/1971 | Rorholt | 340/152 R |
| 3,601,806 | 8/1971 | Heimbigner | 340/151 |
| 3,824,550 | 7/1974 | Schoenwitz | 340/163 |
| 3,868,640 | 2/1975 | Binnie | 340/151 |
| 3,878,322 | 4/1975 | Sullivan | 340/408 X |
| 3,921,139 | 11/1975 | Hardesty | 340/151 X |

Primary Examiner—Harold I. Pitts
Attorney, Agent, or Firm—Kenway & Jenney

[57] ABSTRACT

A communication system for the transfer of information between a central station and an addressed point has the points organized in decimal groups at different remote stations, and selects a point for communication after enabling the group thereof with a unique station address. The central station equipment produces multiple-level addressing signals in serial sequence appropriate for transmission on a pair of conductors with other signals having a different frequency characteristic. All remote stations can be coupled in common with the central station, but the many points are normally inactive with regard to communication with the central station. An addressed remote station activates a selected point therein for transferring information with the central station.

18 Claims, 6 Drawing Figures

CENTRAL STATION TO ADDRESSED POINT COMMUNICATION SYSTEM

BACKGROUND

This invention relates to an electrical signal transmission system for communicating information, including control signals, between a central station and a selected location, or point, at any one of several remote stations. More particularly, the invention provides a signal communication system for monitoring any selected one of many remote points, and for effecting a control operation at a selected point.

A feature of the system is the capability of operating with each of a large number of remote points with minimal interconnecting communication paths or channels, and with relatively simple, i.e. noncomplex, equipment, both at the central station and at each remote, point-controlling, station.

The invention is useful, for example, in monitoring conditions as in a fire detection system in a large, multiple-unit building, and for providing control at a remote location responsive to a condition sensed there. Another typical application is in monitoring and controlling the operation of a pipeline, with the remote points at successive locations along it. An advantage of the invention is that it provides such systems with high flexibility in system organization and information communicating capability, with both low cost equipment and low cost installation, relative to prior practices.

Prior art communication systems for monitoring fire, pipeline operation, and like conditions, and for providing control operations at the remote locations being monitored, generally require complex equipment or numerous communication channels between the central station and the remote locations. Consequently the prior systems are characterized by relativey high cost for both equipment and for installation.

It is an object of this invention to provide improved equipment for communicating information — including data, control, and voice signals — between a central station and any selected remote point.

In particular, it is an object to provide an improved multiple-point communication system for monitoring fire detecting test points, and for effecting control at such points where desired, at lesser cost than is available with prior equipment of comparable capability.

Another object of the invention is to provide a system logic organization for addressing any one of multiple points for communication with a central station, which can be implemented at lesser cost than heretofore practiced.

It is also an object that such multiple-point communication equipment of the foregoing character operate with relatively small electrical power consumption.

A further object is that the communication system of the above character have high flexibility in terms of rearrangement of the system and in terms of the kind of information being communicated.

Another object of the invention is to provide a communication system of the above character which operates with relatively high reliablity.

Other objects of the invention will in part be obvious and will in part appear hereinafter.

SUMMARY OF THE INVENTION

A data acquisition and control system according to the invention having capacity for one thousand remote communication points has the points organized on a decimal basis, e.g. in sets of ten at each of one hundred remote stations. A central station connects with the remote stations by way of a transmission link that can be common to all of the remote stations. The transmission link can be a cable having as few as two conductors, and can utilize existing electrical power distributing conductors.

The central station of the communication system has an address generating unit for producing signals to address the remote point for communication, and a response detection unit for sensing a report signal from the addressed remote point and for developing in response a corresponding output manifestation. The address generating unit develops a multiple-level, serial address signal suitable for transmission to the remote stations on a pair of conductors together with other signals having a different frequency characteristic. The address signals are decimally coded, and the more significant digit signals select a remote station for communication and the lesser significant digit signals select a particular point associated with that remote station for communication with the central station.

The central station includes inhibit logic that responds to the production of signals addressing a remote point to inhibit the production of further address signals until an appropriate response is received from the addressed point.

The remote stations are normally inactive relative to the transmission link coupling them to the central station. However, upon being addressed, a remote station provides a specified signal-transferring operation with the central station. In particular, an addressed remote station enables a normally-inactive response section therein to respond to the least significant, point selecting, addressing signals.

The invention accordingly comprises the features of construction, combinations of elements and arrangement of parts exemplified in the constructions hereinafter set forth, and the scope of the invention is indicated in the claims.

BRIEF DESCRIPTION OF DRAWINGS

For a fuller understanding of the nature and objects of the invention, reference should be had to the following detailed description taken in connection with the accompanying drawings, in which.

DESCRIPTION OF ILLUSTRATED EMBODIMENT

Overall System Description

Figure 1:
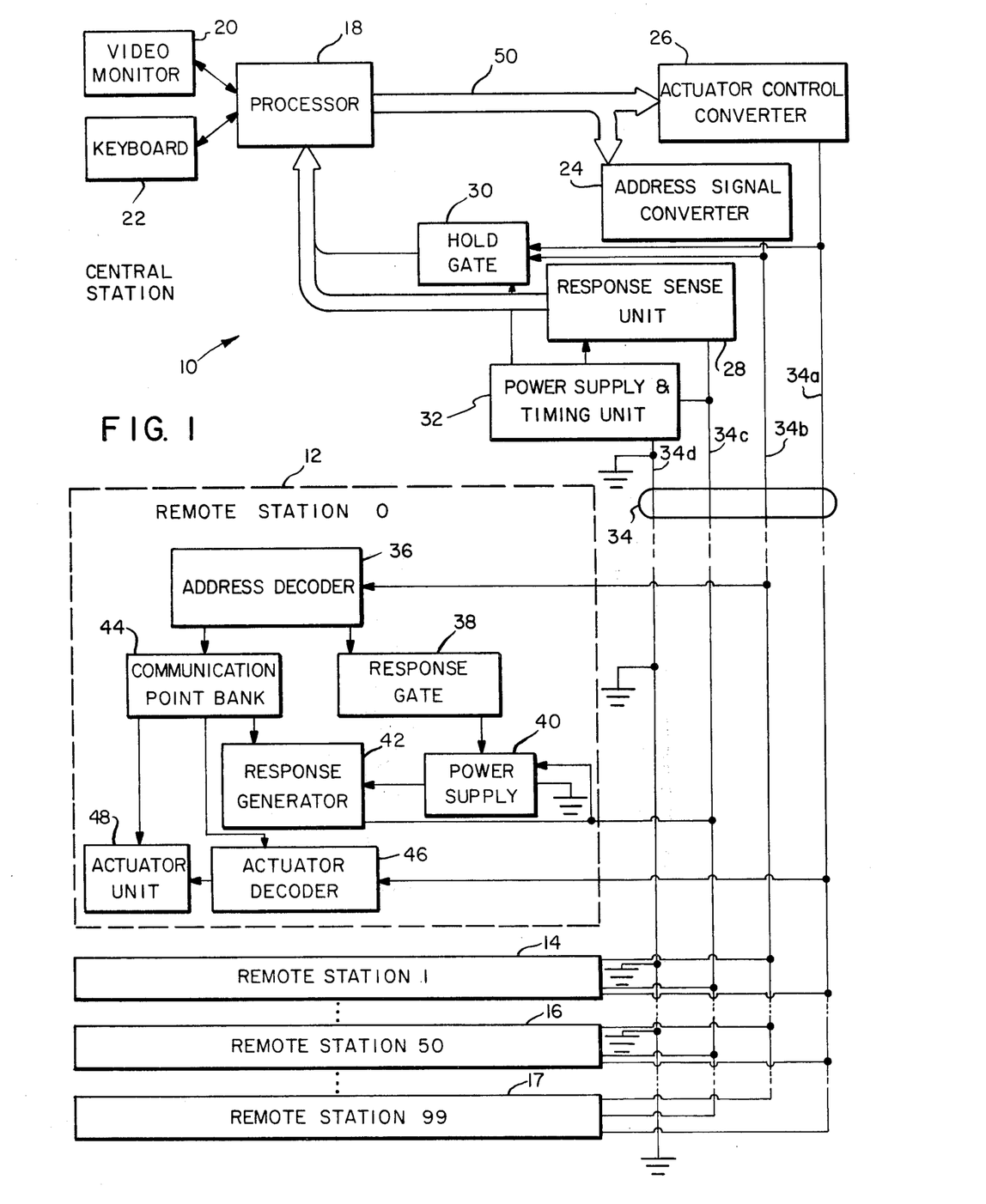
FIG. 1 is a block schematic representation of a communication system according to the invention.

FIG. 1 shows a communication system acccording to the invention which has a central station 10 and plural remote stations 12, 14, 16 and 17. An operator interfaces with the communication system by way of a video display monitor 20 and a keyboard 22 which are connected with a controllable or otherwise programmable digital data signal processor 18 at the central station 10. To communicate with any one location or point at a remote station, the processor 18 provides coded address pulses to an address signal converter 24. Similarly, to operate an actuator located at any remote point, the processor applies coded pulses to an actuator control converter 26. The response from an addressed remote point is detected at the central station with a response-sensing unit 28, which in turn applies resultant response information to the processor 18. A hold gate 30 at the central station inhibits the processor from addressing another remote point until after the sense unit 28 has received an appropriate response from the previously addressed remote point. Also at the central station 10 is a power supply and timing unit 32 which powers and operates elements within the central station, and can apply power to the remote stations.

A single transmission link 34 can interconnect the central station with all the remote stations in common, as illustrated. The illustrated transmission link has four conductors, one carrying actuator control signals, a second carrying address signals, and a third conducting the central station power to the remote stations and applying the response signals from the remote station to the central station sense unit 28. The fourth transmission link conductor 34d is a ground or other common return path.

The transmission link 34 can take the form of four separate conductors, as indicated, or can be a wireless link. Alternatively, it can make use of existing interconnections such as a.c. power lines present at an installation, or be a combination of the foregoing and other known forms of transmission paths. As described hereinafter with particular reference to FIG. 6, the signals on the transmission link 34 can be adapted for propagation on a two-channel or two-conductor link, rather than the four-path arrangement which FIG. 1 illustrates.

With further reference to FIG. 1, the illustrated number 0 remote station 12, which is illustrated as typical of all the remote stations in the system, has an address decoder 36 that receives from the transmission link 34 the address signal output from the central station address signal converter 24. The address decoder 36 responds to a first station-identifying portion of the address signal to actuate a response gate 38. The actuated response gate enables a power supply 40 to operate a response generator 42. A further portion of each set of address signals, which identifies specific communication points associated with the addressed station, cause the address decoder 36 to transfer information between the central station and a selected communication point in a bank 44 thereof associated with the station 12. Where the remote station 12 is to transmit information identifying a condition at the selected communication point, e.g. the condition of a fire detector, the selected communication point within the bank 44 is placed in circuit with the response generator 42 to apply the appropriate response signal to the transmission link 34 for transmission to the central station sense unit 28. Where an actuator assigned to the selected communication point is to be controlled, an actuator decoder 46 in the remote station, in conjunction with the addressed bank of communication points 44, effects the selected operation in an actuator unit 48.

System Operating Logic

The communication system of the invention is described further with reference to an embodiment in which there are up to one thousand communication points, each of which is capable of connection to a condition sensor and to an actuator, e.g. to a temperature-sensitive resistor for fire detection and to a latching relay, respectively. The communication points are organized into one hundred groups or banks numbered 0 to 99 and of ten points each, with the points in each group being numbered 0 through 9. With this organization, three decimal digits identify any one communication point. For example, in the decimal address 534, the hundredths and tenths digits 5 and 3 identify the 53rd remote station, and the units digit 4 identifies the fourth communication point at that station.

Figure 2:
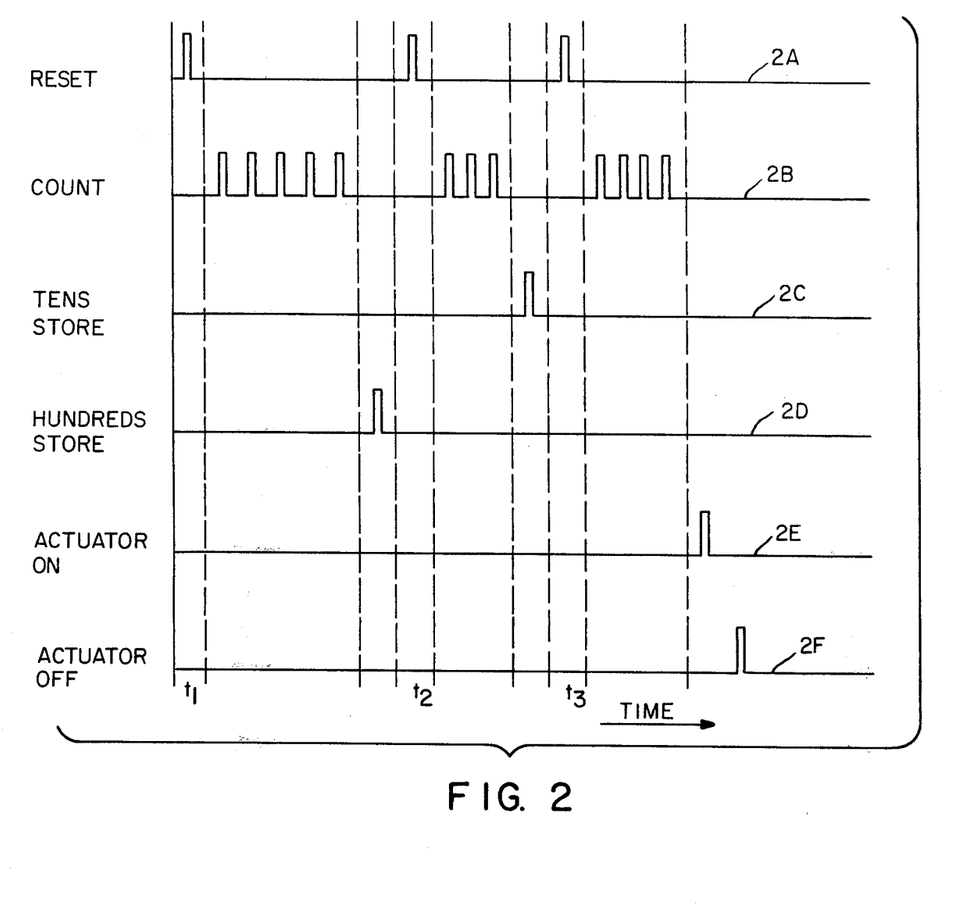
FIGS. 2 and 3 show electrical wave-forms with which the central station operates according to one embodiment of the invention.
Figure 3:
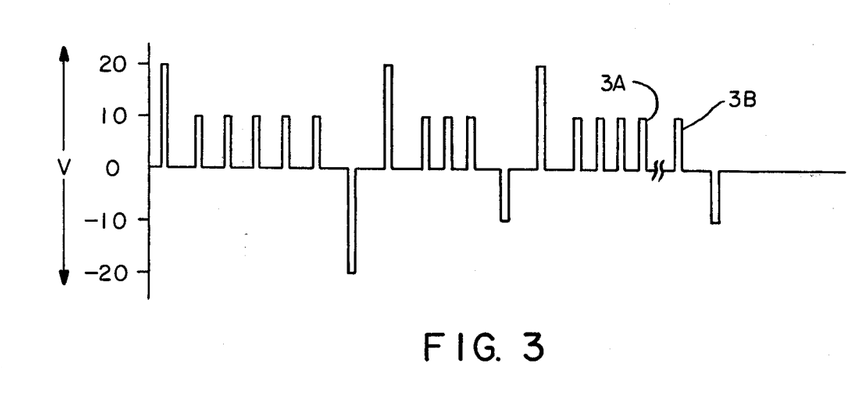

FIGS. 2 and 3 show the electrical wave-forms for providing addressing and control operations according to an embodiment of the invention with the foregoing system organization. FIG. 3 shows the wave-forms which the central station applies to the remote stations via the transmission link, and FIG. 2 shows corresponding binary signals from the processor 18 with which the central station develops the FIG. 3 wave-forms. In particular, the central station processor 18 of FIG. 1 produces binary pulses on four lines of a cable 50 to address any communication point, and produces binary pulses on two other lines of the cable to operate the relay or other actuator at an addressed point. The illustrated central station converters 24 and 26 convert the four lines of addressing pulses and the two lines of actuator-operating pulses to serial signal sequences on two conductors, one of which carries a five-level signal and the other a three-level signal. (Alternatively, the serial sequence of signals can be developed on a single conductor, relative to ground, with seven different signal values to identify both the addressing and the actuator operating commands.)

More particularly, FIG. 2 shows a specific embodiment of this logic of the binary pulses from the processor during an operating cycle in which the central station is addressing the communication point number 534. At time $t1$ in the beginning of the cycle, the processor applies a reset pulse to a reset line of cable 50 (Reset wave-form 2A). This pulse resets the address decoders in all remote stations, e.g. decoder 36 in station 12. The processor then produces on a count line of cable 50 a number of binary pulses (wave-form 2B) equal to the decimal hundreds digit of the communication point to be addressed; for the example being illustrated the processor accordingly produces five count pulses, as shown. As soon as this number of pulses is applied to the count line, the processor produces a pulse (wave-form 2D) on a store hundreds line of the cable 50 to signal the remote station address decoders to store that number of pulses in a register associated with the most significant, i.e. the hundreds place, digit. The operating cycle continues with the production, at time $t2$, of another line pulse followed by count-line pulses equal to the tens digit of the selected address, which in the present instance is three. Next, the processor 28 produces a pulse (wave-form 2C) on a store tens line of the cable. This pulse operates all remote-station address decoders to store the immediately preceding group of count pulses in a tens register or the like. The operating cycle continues with the production at time $t3$ of another reset line pulse, followed by count line pulses corresponding to the units digit of the specified address, which in the present example is four. In the illustrated preferred embodiment, the remote stations are so arranged that it is not necessary to produce a further store signal, i.e. a units store pulse corresponding to the hundreds store and tens store pulses. At this juncture in the operating cycle, the processor 18 has produced all the signals necessary to address a single one of the one thousand possible communication points, i.e. point number 534.

Where this selected communication point is connected with an actuator that is to be operated at this time, the processor may produce a pulse on either one of two relay lines to place the selected actuator in one of two conditions, e.g. ON or OFF (Wave-forms 2E and 2F respectively).

The central station address and actuator converters 24 and 26 responds to the foregoing address and actuate pulses to produce the set of multiple-level signals shown in FIG. 3. In particular, the illustrated address signal converter 24 produces a pulse for each reset pulse, count pulse, store tens pulse, and store hundreds pulse; but with a different analog value for each kind of pulse. Accordingly, the illustrated address converter 24 produces on a single transmission link conductor 34a a single serial set of five-valued signals (wave-form 3A) in response to the binary address signals of FIG. 2. In this sequence, the first pulse is a (+20) volt reset signal, and is followed by a sequence of (+10) volt "hundreds count" signals, of which there are five in the present example. These are followed by a (−20) volt store hundred pulse. The sequence continues with another reset pulse, followed by the same (+10) volt "tens count" pulses, of which there are three, followed by a (−10) volt "store tens" pulse, after which another (+20) volt reset pulse occurs followed by the units-valued count pulses.

Further, the illustrated actuator control converter 26 produces on an actuator line 34b of the transmission link a single pulse having either a "turn on" or a "turn off" analog value; wave-form 3B. Where it is desired that the transmission link 34 carry the address signals and the actuator signals on the same conductor (relative to ground), these latter two signals can be produced on the same conductor with the address signal sequence of wave-form 3A, but with one of two values which differ from the values of the addressing pulses, e.g. with plus or minus (30) volts.

Central Station

Figure 4:
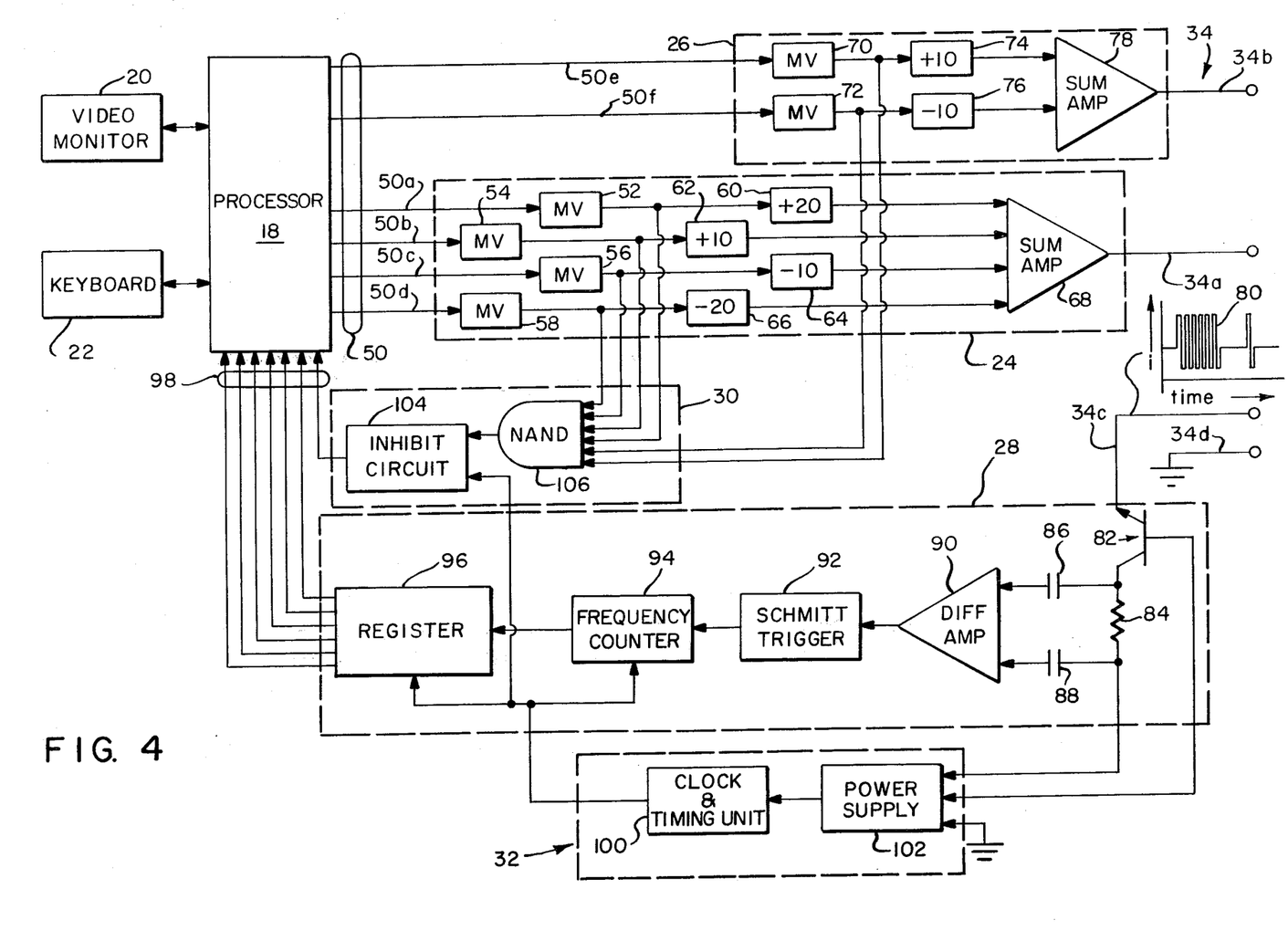
FIG. 4 is a schematic representation of central station equipment for the system of FIG. 1.

Turning to FIG. 4, the central station 10 of the FIG. 1 system provides the foregoing operation described with reference to FIGS. 2 and 3 with an address signal converter 24 that receives the signals on the four address lines of cable 50. In response, the converter produces the single sequential multi-level address signal which FIG. 3 illustrates on transmission link conductor 34a. The illustrated converter has multivibrators 52, 54, 56 and 58, each of which receives the binary pulses on one line from processor 18 and in response drives a voltage driver 60, 62, 64, and 66, respectively. In accordance with the multi-level logic of FIG. 3, the voltage driver 60 produces a pulse of (+20) volts when gated by the pulse which multivibrator 52 produces when it receives an assertive binary pulse on the reset line 50a from the processor 18. Similarly, the voltage driver 62 produces a pulse of (+10) volts each time the multivibrator 54 connected with it receives an assertive count pulse from the processor. The driver 64 produces (−10) volt pulse, which is the store tens pulse, in response to each assertive signal on the tens line 50c of cable 50, and the driver 66 produces a (−20) volt store hundreds pulse when it is gated ON. A summing amplifier 68 receives the foregoing multiple level pulses and produces a signal having the logical format shown in FIG. 3, wave-form 3A, on the single transmission link conductor 34a.

Similarly, the actuator control converter 26 illustrated in FIG. 4 has two pulse-shaping monostable multivibrators 70 and 72, which respectively receive the actuator ON and actuator OFF signals which the processor 18 applies to lines 50e and 50f of cable 50. Each multivibrator drives a voltage driver 74, 76; and summing amplifier 78 combines the actuator control signals output from the drivers to a single conductor 34b of the transmission link. In accord with the signal format of wave-form 3B, the driver 74 produces a (+10) volt actuator ON signal, and the driver 76 produces a (+10) volt actuator OFF signal.

With continued reference to FIG. 4, the illustrated central station response sense unit 28 senses a selected alternating current response from the addressed remote station communication point. In the present embodiment, each remote station produces this current with a nominal frequency of 20 kilohertz. The response signal is shifted from the nominal frequency in accordance with the information being sensed at the addressed point. The illustrated sensing unit 28 accordingly is designed to operate with a signal having the wave-form 80 indicated at the right side of FIG. 4. When no point is addressed, i.e. in the absence of the alternations, the current has a low value; this is the quiescent current which the power supply 32 applies to the remote stations by way of the transmission link 34. However, when a point having a condition sensor is addressed, the remote station involved produces a pulse of switched or oscillating response current for the time interval in which that point is addressed, after which the current returns to its nominal value until another test point having a sensor is addressed.

In the sensing unit 28, this current having the wave-form 80 is connected by way of the transmission link conductor 34c through the emitter-collector path of a transistor 82 thence through a current sensing resistor 84. Blocking capacitors 86 and 88 couple the voltage drop across the resistor 84 to a differential amplifier 90. A Schmitt trigger 92 receives the amplified pulses output from the amplifier and produces a corresponding wave-form of pulses suitable for counting by a frequency counter 94. A register 96 receives the count in the counter 94 and stores it for delivery to the processor 18 by way of a cable 98.

A clock and timing unit 100 synchronized with the processor 18 at least with regard to the application of addressing and actuator-controlling pulses to the cable 50, controls the frequency counter 94 to commence a new count during each operating cycle, i.e. each time a different or new communication point is addressed. The unit 100 also signals the register 96 prior to the end of each operating cycle to store the count then in the counter 94. In this manner, each time the processor 18 addresses a different communication point, the frequency counter is reset to count the frequency of the response signal which identifies the condition being sensed at the addressed communication point. After the selected communication point is disconnected from the central station, the count in the counter is transferred, under control of the clock unit 100, to the register 96 for transfer to the procesor 18.

The power supply 102 in the unit 32 of FIG. 4 supplies operating power for the above-described elements in the converters 24 and 26 and in the sensing unit 28, as well as for the clock unit 100. The power supply also applies a direct operating voltage for the remote stations to the transmission link conductor 34c by way of the resistor 84 and transistor 82. In particular, the transistor 82 is arranged in a cascode pass configuration in which the power supply 102 applies, through the resistor 84, a higher d.c. voltage to the transistor collector than it applies to the base, e.g. the supply voltage applied to resistor 84 is (+36) volts and that applied to the transistor base is (+24) volts. This arrangement maintains an essentially constant voltage at the transistor emitter, for operating the remote stations of the communication system. Moreover, it allows the collector-emitter current through the transistor to vary in accordance with the response signal which any remote station communication point applies to the transmission link conductor 34c.

With further reference to FIG. 4, the illustrated hold gate 30 has an inhibit circuit 104 illustrated as having two inputs, one from a NAND circuit 106 and the other from the clock unit 100. The inhibit circuit 104 produces an assertive output signal, which inhibits the processor 18 from producing further signals on the cable 50, for a selector time in each operating cycle after a set of address and actuator control signals are applied to the cable 50. As illustrated, the pulse output from each multivibrator in the converter 24 and converter 26, in response to a signal on the processor output cable 50, is applied also to the NAND circuit 106. In response to the first such pulse in each operating cycle, the NAND circuit conditions the inhibit circuit 104 to apply the assertive, inhibiting output signal to the processor commencing a selected time thereafter. This selected time delay allows the processor to complete applying a full set of address (i.e. reset, count, and tens and hundreds store signals) and actuator control signals before being inhibited from producing further such signals. The inhibit circuit 104 maintains the inhibit signal present until the clock unit has transferred the contents of the frequency counter 84 to the register 96, i.e. until expiration of the maximum normal time interval required for response from the addressed communication point to the address and actuator signals. At that point, the inhibit circuit returns its output signal to the nonassertive level, which releases the computer to signal the converters 24 and 26 with further address and actuator control signals. Alternative to releasing the inhibit signal after a selected time, verification tests preformed on the return signals can be employed prior to releasing the inhibit signal.

With further reference to FIGS. 1 through 4, it should now be apparent that the central station processor 18 can be any one of a number of general purpose programable computers, and particularly a minicomputer such as the Digital Equipment Corporation PDP 8 computer operating with conventionally-available standard software. A typical operating sequence of the processor with regard to the remaining central station equipment shown in FIG. 4 is to first determine whether the inhibit signal is present. If so, the processor takes no further action with regard to the central station equipment. When the inhibit signal is released, the processor develops the address signals and whatever actuator control signals are appropriate for the next operating sequence. This can be done in response to a program stored in the processor or in response to instruction signals the processor receives from the keyboard 22. After this set of signals is developed and sent out on the cable 50, the processor is inhibited from producing a further such set by virtue of the inhibit signal being present, but it is ready to read in the count which the frequency counter 94 applies to the register 96. When this return information is in the normal range expected for the addressed communication point, the processor is free to commence another operating cycle. The processor can be arranged to log the value of the report from the addressed communication point as desired. The processor can also determine whether the report signal has an abnormmal value and, if so, commence a routine of further operations standard in the process control industry and typically including rendering an alarm of the noted malfunction. The processor 18 is not described further, inasmuch as its construction and operation can follow any one of many well-known and conventionally-available practices with a conventional video monitor 20 and a conventionally-available keyboard 22.

Remote Stations

Figure 5:
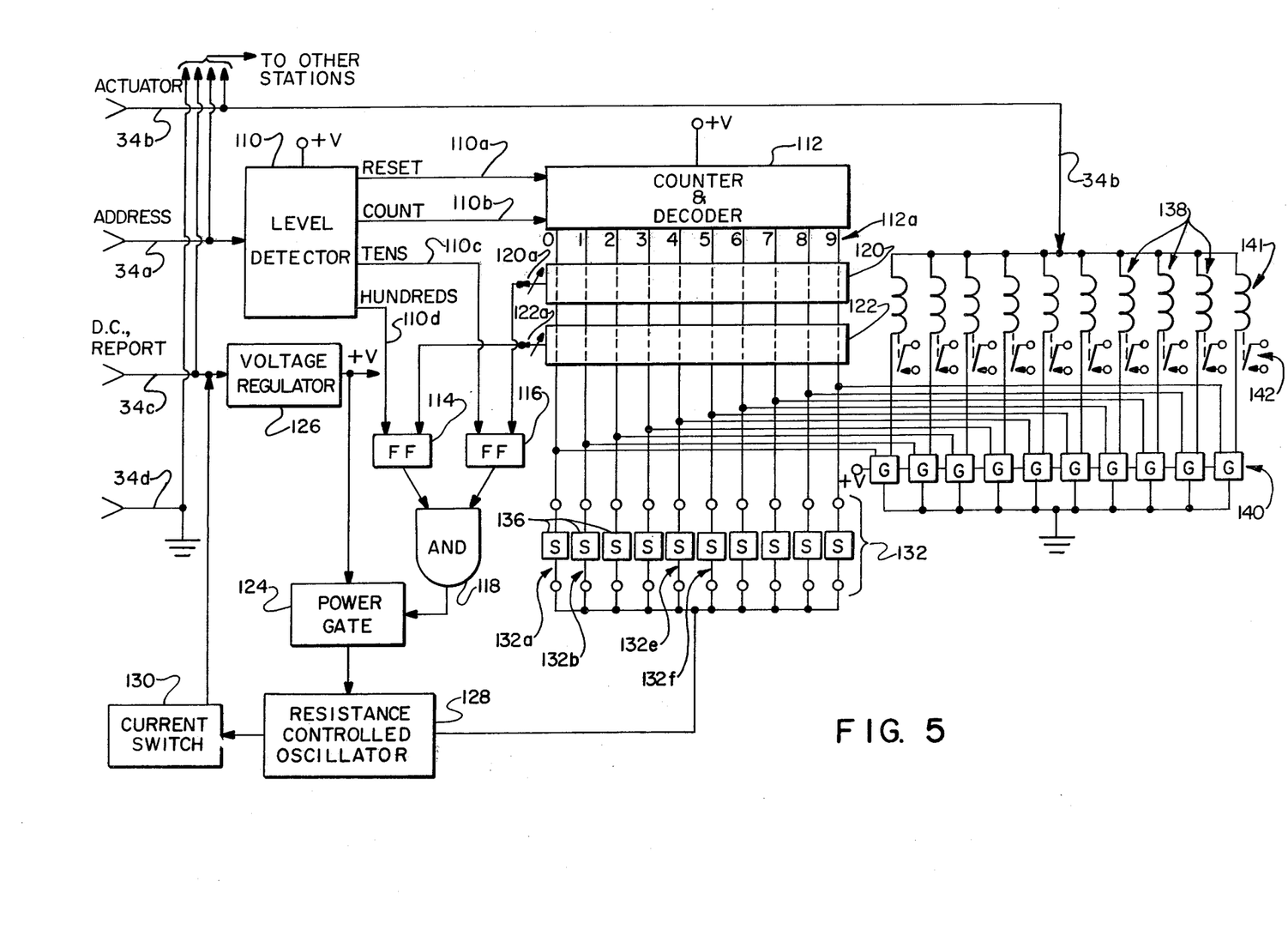
FIG. 5 is a schematic representation of remote station equipment for the system of FIG. 1.

FIG. 5 shows remote station equipment typical of that which can be used at each of the one hundred stations 12, 14, 16 and 17 of FIG. 1 for operation with the central station equipment of FIG. 4, and with the signals of FIG. 3. The illustrated remote station, which connects directly to the four conductors of the transmission link 34 (as can all other like remote stations), has a voltage level detector 110 and a counter 112 which, together with flip-flops 114 and 116 and an AND (coincidence) gate 118, correspond to the address decoder 36 of FIG. 1. The level detector 110 decodes the five-level signal (FIG. 3, wave-form 3A) on the count conductor 34a. In accord with the logic of that wave-form, in response to a (+20) volt level, the detector 110 develops a pulse on a reset output 110a, and a (+10) volt signal actuates the detector to apply a pulse to a count output 110b. The detector 110 develops a pulse on a tens output 110c in response to a (−10) volt input signal, and develops a pulse on a hundreds output terminal 110d in response to a (−20) volt input signal.

The reset pulse output from the level detector resets the decimal counter 112, which then counts pulses which the detector develops at the count output 110b. The counter 112 energizes one of its ten output terminals 112a according to the number of count pulses it receives after being initialized with the reset pulse. The counter outputs 112a are applied to the fixed contacts of two station-addressing selector switches 120 and 122. Each switch 120, 122 is in effect a single pole-decimal throw switch, and couples the voltage developed at one output of the counter 112 to its pole or movable contact 120a, 122a respectively.

The logic network formed by flip-flops 114 and 116 and gate 118 responds to the counter outputs selected by the addressing switches, and to the hundreds and tens pulses output from the level detector 110, to close a normally open power gate 124. The combination of these signals which causes the gate 124 to close occurs only when the station is being addressed. The gate then applies operating voltage from a voltage regulator 126 to a resistance-controlled oscillator 128. More particularly, the switches 120, 122 are set, typically manually, to specify the station address to which the remote station will respond. For example, when the remote stations in a system as shown in FIG. 1 are identified with two decimal digits, and the station illustrated in FIG. 5 is identified as number 53, the switch 120 is set to the lower significance, tens digit 3 and the switch 122 is set to the higher significance hundreds, digit 5. With this arrangement, when the counter 112 is reset and then receives five count pulses, so that it energizes its associated fifth output terminal 112a, switch 122 will transfer the counter output voltage at that terminal to one input of the flip-flop 114. This voltage enables the flip-flop to switch to the set state in response to a pulse on the hundreds output from the level detector. When set, the flip-flop 114 output signal enables one input of the gate 118. When the counter 112 is then reset and incremented to a count of three, the switch 120 couples the resultant counter voltage to enable flip-flop 116, which is then switched to the set state in response to a tens pulse output from the level detector. In this state, flip-flop 116 actuates the enabled gate 118, which in turn actuates the power gate 124 to apply voltage, which the voltage regulator 126 develops at a selected level in response to the power received from the d.c. line of cable 34, to operate a resistance controlled oscillator 128. This oscillator together with a current switch 130 corresponds to the response generator 42 of FIG. 1.

Each counter output terminal 112a is further connected to apply the voltage developed there across an associated pair of test point terminals 132. Accordingly, the number ZERO counter output terminal 112a is connected with the pair of test point terminals 132a, the number ONE terminal 112a is connected to test point terminal pair 132b, etc. As FIG. 5 further illustrates, a sensor 136 having an electrical impedance responsive to environmental condition, e.g. a temperature-sensitive resistor, is connected across each pair of test point terminals 132.

The operation of the FIG. 5 remote station with the foregoing arrangement commences with the addressing switches 120, 122 being set to the specified address of the station. Thereafter, during operation of the system as shown in FIG. 1, the level detector 110 decodes the multi-level signal which it receives on the transmission link conductor 34a. The detector as well as the counter 112 receives operating voltage either directly from the d.c. line 34c or, as indicated, from the voltage regulator 126 in the station. When the level detector receives a sequence of count signals that causes it to increment the counter 112 to the count corresponding to the setting of switch 120 so that the ensuing tens pulse sets flip-flop 116, and increments the counter to the count to which switch 112 is set so that the ensuing hundreds pulse sets flip-flop 114, the concurrence of the two flip-flops being set actuates gate 118 to close the power gate 124, which then applies operating voltage to the resistance controlled oscillator 128.

At this point, the signals on the transmission link 34 have addressed the remote station. Note also that all other remote stations constructed similarly to that shown in FIG. 5 and connected with the transmission link 34 receive the same addressing signals as the station ilustrated in FIG. 5. However, only the station which is set by way of the addressing switches 120 and 122 to respond in full to the specified address responds to the addressing signals. (note that more than one remote station can, where desired, be assigned the same address.)

The illustrated operating sequence continues with the counter 112 again being reset and then incremented to a count specifying the test point with which the central station is to communicate. In the example discussed above with reference to FIGS. 2 and 3, this is the fourth sensor and accordingly the counter 112 receives pulses that increment it to apply an output voltage only to the number four test point terminal pair 132e.

The environmentally-responsive condition of the sensor 136 connected across this terminal pair 132e causes a selected portion of that voltage to be coupled (or equivalently, causes a corresponding resistance to be applied) to the oscillator 128. In response to this sensor-responsive condition, the oscillator drives the current switch 130, which preferably also receives operating power only when the power gate 124 is closed to minimize electrical power consumption, at a frequency F1 directly responsive to the condition to which the sensor at the selected terminal pair 132e is exposed. The current switch 130 applies current switched at the oscillator frequency to conductor 34c of the transmission link 34, for communication back to the central station, where it is applied to the response-sensing unit 28 of FIGS. 1 and 4.

The system as shown in FIG. 1 and in further detail in FIGS. 4 and 5 typically continues an operating sequence in which it next addresses the next, i.e. the number five test point terminal pair 132f in the same remote station, and senses the response from the sensor connected there. In this manner the system can address and sense the environmental conditions at each of the ten test points associated with a remote station (FIG. 5) in sequence, as well as communicating with each test point independently and in whatever sequence is desired.

The foregoing condition-sensing operation can provide digital or analog information at the central station, whichever is desired. For example, where the oscillator 128 whichever is desired. For example, where the oscillator 128 has a nominal frequency of twenty kilohertz when coupled with a test point sensor 136 having the nominal value of resistance, e.g. 7½ kilohms, the oscillator can be constructed with known techniques to operate at a frequency that changes in a known relation with the changes in the actual sensor resistance from a short circuit to an open circuit. Hence the oscillator frequency F1, and correspondingly the switching rate at which switch 130 produces the return current to the central station, varies continuously in known relation to the condition which the sensor monitors.

With further reference to FIG. 5 the actuator decoder 46 of FIG. 1 can be constructed as indicated with latching relays 138 as the actuators. There is one relay for each of the ten addressable test points 132, and each is preferably of the latching type, in that it remains in whatever position to which it is switched after termination of the switching signal. The coil 141 of each relay 138 is electrically in series with a separate gate 140 between the relay line 34b of the transmission link cable and ground or other common return path of the transmission link conductor 34d. The transmission link conductor 34b can be common to all the relay coils in the various, similarly-constructed remote stations. The relay contacts 142 are connected to other equipment not shown in FIG. 5 but which FIG. 1 indicates as the actuator unit 48.

Each gate 140, which can receive operating voltage from the voltage regulator 126, is normally open, i.e. blocks the passage of current through the associated relay coil even when voltage is present on the relay line 34b. Each gate is also connected, however, with one associated counter output terminal 112a and closes to pass current, in either direction depending on the voltage on the relay line 34b, when the counter 112 energizes that output in response to count pulses from the level detector 110. Accordingly, when a pair 132 of test point terminals is addressed, the voltage on the relay line can operate the associated relay.

The system of FIG. 1 can utilize the switching capability of the FIG. 5 relays 138 to provide two-way voice communication between the central station and any of the remote test points, when the transmission link 34 has a two-way voice link, e.g. a further pair of conductors. All that is required is that the two leads of the voice transducer, e.g. a telephone headset, be connected in series with single-pole, single-throw contacts 141 of a relay 138 and this series combination be connected across the two voice conductors. The relay can then connect and disconnect the voice transducer with the voice conductors. Further, by employing a single-pole, single-throw "call" switch as the sensor 136 associated with each voice-controlling relay, the system can monitor whether someone desires to initiate voice communication from the associated test point. That is, upon being interrogated by the central station, such a test point will report a binary signal, the value of which can identify whether voice communication is desired.

It should now be understood that with the foregoing construction a system constructed in accordance with FIG. 1 can operate to address any one of at least one thousand test points, and can both sense environmental or other conditions at that test point and effect a control operation there. A simple four-path transmission link interconnecting the central station and all remote stations in common can carry out all of these operations. Moreover, where desired, this operation can be carried out with a transmission link having only two conductors or other paths, or even using existing sixty hertz or other power conductors for the transmission link. This is now described with reference to FIG. 6.

Two-Wire Transmission Path

Figure 6:
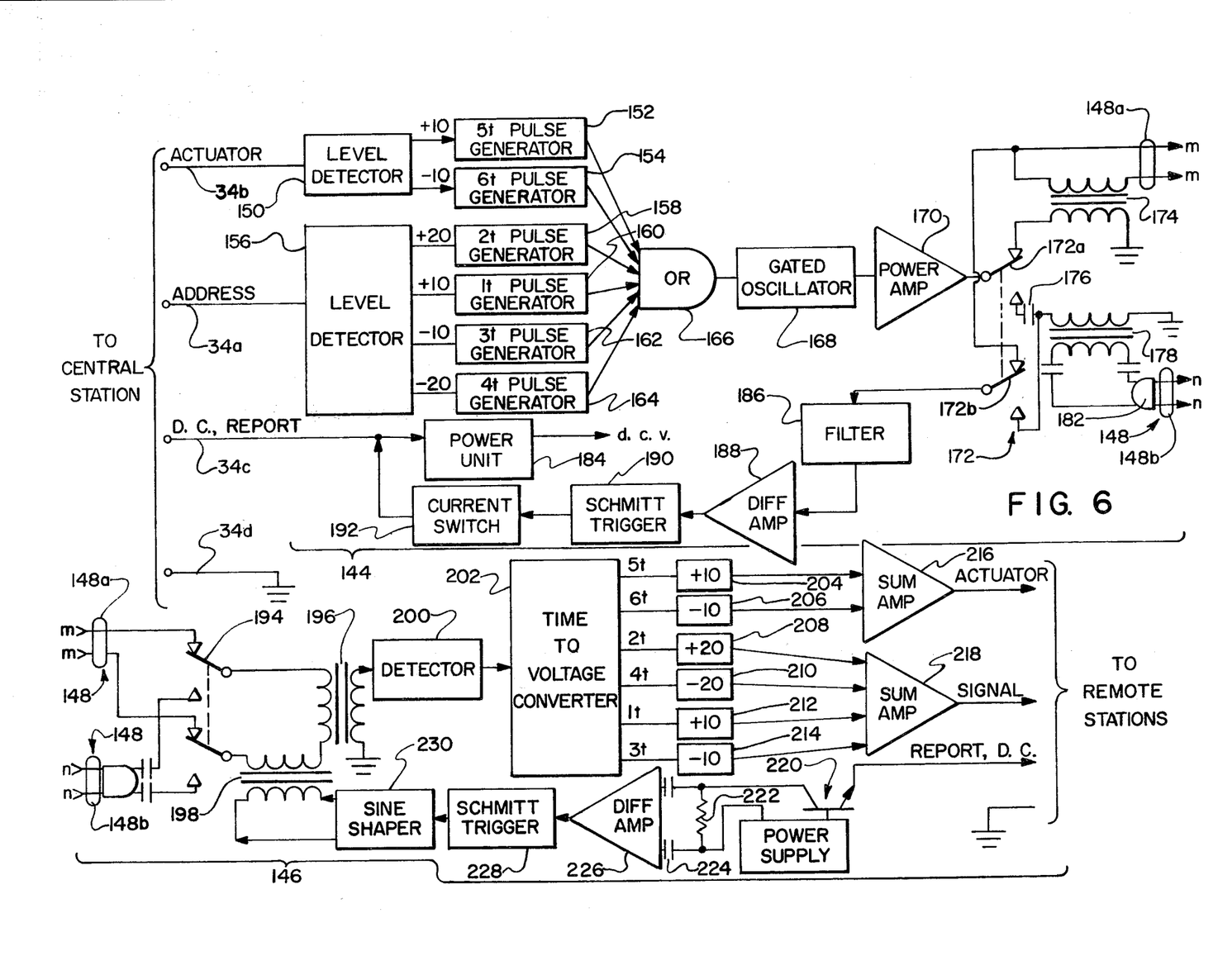
FIG. 6 is a schematic representation of central station and of remote station converters for use with a two-conductor transmission link in the system of FIG. 1.

FIG. 6 illustrates equipment for connection in the transmission link 34 of FIG. 1 between the central station 10 and the remote stations. The equipment includes a pair of conversion units 144 and 146 of the modem type with a two-wire or other two-path electrical interconnection 148 between them. The central station conversion unit 144, which connects to the four transmission link conductors 34a, 34b, 34c, and 34d as shown at the left side of FIG. 6, has a level detector 150 that distinguishes between the two actuator-controlling pulses on the conductor 34b to trigger one of two pulse generators 152 and 154, which produce output pulses with a duration that is a multiple of a given period ($t$), typically 0.3 millisecond. As designated, the illustrated pulse generator 152 which the detector 150 actuates in response to a (+10) volt pulse produces a pulse with a duration of five such periods, and the generator 154 which the detector actuates in response to a (−10) volt pulse produces a pulse with a duration of six such periods. Similarly, a further level detector 156 receives the signals on the count conductor 34a and actuates one of four pulse generators 158, 160, 162, 164 to produce a pulse of two, one, three or four time interval durations, respectively, depending on whether the count signal amplitude is (+20) volts, (+10) volts, (−10) volts, or (−20) volts, all as indicated. An OR gate 166 actuates a gated oscillator 168 for the durations of the pulses output from the generators. After amplification in a power amplifier 170, the different-length tone bursts output from the oscillator 168, which operates at a frequency F2 preferably different from the frequency F1 of the remote station oscillator, are applied to the two-path interconnection 148.

Where this interconnection is a two-wire or coaxial cable 148a, the amplifier 170 output signal is applied through one section 172a of a double-pole, double-throw switch 172 to the primary winding of a transformer 174. The transformer secondary winding is connected across the two conductors of the two-wire cable 148a.

Alternatively, where the interconnection 148 is by way of two conductors 148b of an electrical power system, the switch section 172a applies the amplified tone bursts through a blocking capacitor 176 to the primary winding of a transformer 178. The transformer secondary winding is capacitor coupled to a conventional a.c. power plug 182 which connects conveniently to the a.c. power line 148b. The oscillator 168 preferably operates at a radio frequency which is readily separated from the principal and harmonic frequencies of the power system. For example, a 150 kilohertz oscillator is typical for use with a 60 hertz power line 148b.

With further reference to FIG. 6, the illustrated central station conversion unit 144 has a power unit 184 with which it develops operating power for the other elements thereof in response to the voltage on the transmission link conductor 34c.

The return signal from a remote station, i.e. as produced with the FIG. 6 current switch 130, is applied in the conversion unit 144 to the d.c. line 34c of the transmission link for communication to the central station as follows. Another switch section 172b couples the return signal from the two wire interconnection 148a, and alternatively from the a.c. power line 148b by way of a connection between the primary winding of transformer 178 and capacitor 176, to a filter 186. The filter pass band is centered at the nominal frequency of the FIG. 5 remote station oscillator 128, e.g. twenty kilohertz, so that signals outside the frequency range of the return current do not pass. The filtered signal is amplified with an amplifier 188 and squared with a Schmitt trigger 190, which drives a current switch 192. The output of this switch is applied to the conductor 34c that feeds to the central station equipment of FIG. 4. The output signal from the current switch 192 is identical to that of the FIG. 5 remote station current switch 130, as is desired.

With further reference to FIG. 6, the remote station conversion unit 146 coupled to the other end of the two path interconnection 148 also has, for generality of illustration, a double-pole, double-throw switch 194 for connection to either a two-wire or coaxial interconnection 148a or an a.c. power line 148b, whichever is used. In either event, the signal which the switch couples to the unit 146 is applied in series to primary windings of transformers 196 and 198; which can be different sections of a single winding with a common core. The secondary winding of transformer 196 couples the gated tone bursts at the frequency F2, produced in the oscillator 168 of the conversion unit 144, to a detector 200 operating at the same frequency F2. A time-to-voltage converter 202 receives from the detector 200 direct voltage pulses having durations equal to multiples of one to six times the aforementioned time period (*t*) and energizes one of six output terminals depending on the input pulse duration. The converter 202 can be constructed to carry out this operation according to known techniques, e.g. by employing a counter to develop a count for the duration of each pulse. Alternatively, the converter 202 can charge a capacitor during the interval of each pulse and then identify the duration of that pulse according to the voltage to which the capacitor has been charged.

Each output of the converter 202 is connected to actuate a separate voltage generator 204, 206 . . . 214 to produce a different level pulse for each of the different-interval pulses input to the converter 202. The voltage generators 204–214 thus function essentially the same as the voltage drivers 60–66 and 74, 76 of FIG. 4. As also found in FIG. 4, the different voltage levels output from the voltage generators 204–214 are applied to summing amplifiers 216 and 218, the former amplifies the (+10) and (−10) voltage actuator-controlling signals and applied them to one conductor of a transmission link conductor 34*b*. The latter amplifier 218 amplifies the remaining four-level signals from the converter and applies them to a count conductor 34*a* of the cable. Accordingly, the signals applied to these conductors of the transmission link are identical to the signals which the central station equipment of FIG. 4 applies to the transmission link conductors 34*a* and 34*b*.

Also in the conversion unit 146, return signals from a remote station are coupled through a transistor 220 arranged in a cascode pass configuration to develop a corresponding voltage signal across a resistor 222. Capacitors 224 coupled this signal to a differential amplifier 226, the output of which is squared with a Schmitt trigger 228 and is then converted to sinusoidal waveform with a sine shaper 230. The transformer 198 applies the resultant sinusoidal signal to the switch 194 for application to the interconnection 148. The conversion unit 146 also has a power supply 232 connected with the resistor 222 and the transistor 220, and for powering other elements of the unit 146 as needed. It will be noted that the arrangement in the conversion unit 146 of the elements 220, 222, 224, 226, 228 and 232 is identical to that found in the illustrated response sense unit 28 of FIG. 4.

The invention described above provides significant cost savings in the construction and the installation of a central station-to-remote point communication system. The system is characterized by having the remote points decimally organized, and manual or similarly preset addressing switches specify the address of each remote station of ten such points. The central station selects a remote point for communication by means of addressing signals that employ decimal logic and are transmitted in the form of multiple levels in time sequence. Although described with reference to levels of different voltage, the central and remote stations can be constructed to operate with addressing signals of different frequencies, i.e. with multiple tones, or with a combination of voltage and frequency levels.

The system is capable of performing several kinds of communication operations at each remote point. A sensor of either digital or analog character can be connected at each remote point to transmit a condition-responsive signal of corresponding character to the central station. Further, a control actuator can be provided at each remote point. The actuator preferably is a bipolar latching relay or the like. The actuator function moreover can be combined with that of the sensor, in a manner described above with regard to using the sensor function to signal when voice communication is desired at a remote point and then using the actuator to effect voice communication.

The return signal from each sensor preferably is a current switched at a condition-identifying rate and communicated to the central station on the same conductor that applies operating power to the remote station.

The central station equipment for providing the foregoing capability employs a unique combination of both digital and analog data processing, and interfacing between digital and analog signal formats. The combination of analog and digital logic which the system employs, and the logic with which the system operates including the inhibition of successive sets of addressing signals until receipt of a response from a previously-addressed point, enable the system to operate with high reliability and at a relatively high rate in the presence of electrical noise. The specific hybrid analog digital nature of the system and its logic also endow it with significant operating flexibility.

It will thus be seen that the objects set forth above, among those made apparent from the preceding description, are efficiently attained. Since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. A multiple point communication system having a central station, a plurality of communication points organized into groups, each group being associated with a different remote station, and wherein communication can take place between the central station and each communication point, said system comprising:
   A. address signal generating means at said central station for producing address signals including at least first signals identifying the remote station to be addressed and second signals identifying the communication point of the group within the remote station which is addressed, said generating means including means for producing said address signals using a total of at least three different values in frequency and/or voltage to identify the remote station address information and communication point address information,
   said address signals comprising a plurality of pulses, each pulse being an independent information carrier and being identifiable with a portion of said address signals, said pulses being generated serially,
   B. address responsive means associated with each remote station, each said address responsive means
      1. applying power to an associated response generating means in response to said first address signals identifying the associated remote station, and 2. coupling to said powered response generating means, in response to said second address signals, the associated communication point identified with said second address signals,
C. signal transmission means for communicating said address signals from said central station to each remote station over a common transmission path and for communicating from said remote stations a report signal to the central station,
D. response generating means associated with each remote station, each said response generating means being normally unpowered and when powered, producing an analog valued report signal, responsive to an electrical parameter present at an associated point coupled therewith, and
E. sensing means at said central station for receiving over said transmission means the output of said response generating means and for producing an output manifestation in response to said report signal.

2. A communication system according to claim 1 further comprising
A. inhibit means responsive to point-identifying address signals output from said address generating means to inhibit temporarily said address generating means from producing further address signals, and
B. means for releasing the inhibit of said address generating means within a selected time after the imposition thereof by said inhibit means.

3. A communication system according to claim 1
A. wherein said address signals have at least three different voltage levels, and
B. wherein said transmission means includes means forming a single transmission path communicating said serial address signals to said remote stations.

4. A communication system as defined in claim 1 in which said transmission means includes a first pair of conductors and further comprising
A. first coupling means in circuit between said first pair of conductors and both said address generating means and said sensing means, said first coupling means developing said address signals for transmission to remote stations on said first pair of conductors with a first frequency characteristic and coupling report signals from said same pair of conductors for transmission to said sensing means, and
B. second coupling means in circuit between said first pair of conductors and at least a first group of one or more remote stations, said second coupling means coupling address signals having said first frequency characteristic from said pair of conductors for transmission to said remote stations of said first group thereof, and coupling the report signal output therefrom for transmission to said same pair of conductors.

5. A communication system according to claim 1 wherein
A. said address signal generating means includes
1. means for producing a set of binary signals identifying a remote station and a communication point associated therewith, and
2. means responsive to each said binary signal set for applying corresponding address signals to a single signal path of said transmission means as a succession of signals having multiple values in terms of at least one parameter selected from the parameters of voltage and frequency,
B. each said response generating means includes means for producing said report signal with an analog parameter-responsive value, and
C. said sensing means includes means for receiving said analog report signal from said transmission means and developing a corresponding set of binary signals in response thereto.

6. A communication system according to claim 1 further comprising
A. actuator means associated with each of at least some communication points, each actuator means responding to an electrical control signal for effecting a control operation, and
B. gate means connected with said actuator means and with the address responsive means of the remote station associated therewith, each gate means being normally operative to disable the associated actuator means from effecting said control operation and responding to identification of a communication point in an identified remote station to enable said actuator means associated therewith to effect a control operation.

7. In an electrical signal communication system having a central station and plural communication points organized in groups, each said communication point having terminal means associated with it and each said group being associated with a different remote station, and having signal transmission means for communicating signals between said central station and each remote station, and wherein communication can take place between the central station and at least one communication point at any remote station, the improvement comprising
A. central station means for receiving a binary signal set identifying a communication point at a remote station,
B. central station means responsive to said signal set received thereat and producing in response thereto
1. a first binary-coded decimal signal sequence identifying a remote station,
2. a second binary-coded decimal signal sequence identifying a communication point, and
3. a further signal designating at least one of said signal sequences,
C. normally unpowered reporting means associated with each remote station, each reporting means producing when powered an analog valued report signal responsive to an electrical parameter present at one associated terminal means electrically coupled therewith, and
D. decoder means associated with each remote station, each decoder means being
1. responsive to a first signal sequence identifying that station for applying power to the associated reporting means, and
2. responsive to a second signal sequence for coupling said terminal means of that station which is identified by said second signal sequence with said powered reporting means.

8. In a signal communication system according to claim 7, the further improvement comprising
A. actuator signal generating means associated with said central station for producing actuator-controlling signals,
B. actuator means associated with each of at least some communication points, each said actuator means being operable for effecting a control operation in response to said actuator-controlling signals, C. signal transmission means for communicating said actuator controlling signals from said generating means thereof in common to said actuator means, and D. gate means connected with each actuator means and with said decoder means of the remote station associated therewith, each gate means being normally in a first condition and being in a diffferent second condition when the decoder means connected therewith receives a second signal sequence identifying the associated communication point, each said gate means precluding a control operation by said actuator means connected therewith when in one of said conditions and allowing such control operation when in the other condition.

9. In a communication system according to claim 8, the further improvement wherein each said actuator means includes a latching relay having the coil means thereof connected with said associated gate means.

10. In a communication system according to claim 7, the further improvement wherein said reporting means includes an oscillator, the oscillating frequency of which is responsive to an electrical parameter present at said terminal means coupled therewith.

11. In a communication system according to claim 11, the further improvement comprising temperature sensors connected to each of at least some communication points, each said sensor presenting a temperature-responsive electrical parameter to said oscillator when coupled therewith.

12. In a communication system according to claim 7, the further improvement comprising A. an electrical supply at said central station, and B. transmission means for communicating both electrical power from said supply to each said remote station and said report signal from said remote stations to said central station.

13. In a communication system according to claim 7, the further improvement in which said decoder means associated with each remote station includes resettable selector switch means for each binary-coded digit which said first signal sequence identifies.

14. In a communication system according to claim 7, the further improvement comprising current switching means in said reporting means for producing said report signal as a current switched at a rate responsive to the value of said parameter present at said terminal means which is coupled with said reporting means.

15. In a multiple point communication system having a central station and plural communication points organized in groups, and wherein communication can take place between the central station and at least one communication point, the improvement comprising A. means at said central station
1. for producing an address signal set identifying a group of points and identifying a point in the addressed group thereof, and
2. for processing a report signal and for identifying it with the group and the point identified by an address signal set produced prior to receipt of that report signal, B. a report generator associated with each said group, each said report generator having an unpowered quiescent state and a powered actuated state, said generator producing when actuated a signal with a parameter thereof having an analog value responsive to an impedance coupled thereto, and C. means associated with each said group
1. for applying power to the report generator thereat only in response to selected group-identifying address signals in a set thereof, and
2. for coupling said powered report generator to an electrical impedance associated with the communication point identified by point-identifying address signals in said same set thereof.

16. In a communication system according to claim 15, the further improvement

A. wherein said address signal producing means at said central station includes means for producing said address signals with a first signal parameter thereof having at least three values, and B. wherein each said report generator includes means for producing the report signal therefrom with a second signal parameter, different from said first parameter, having said impedance-responsive analog value.

17. In a communication system according to claim 15, the further improvement

A. wherein said address signal producing means at said central station includes means for producing said address signals with the voltage magnitude thereof having at least three values, and B. wherein each said report generator includes means for providing the report signal therefrom with the frequency thereof having said impedance-responsive analog value.

18. In a communication system according to claim 7, the further improvement wherein said means producing said signals includes means for producing said first and second signal sequences with identical parameters and for producing said further signal with a voltage and/or frequency parameter different from that of said signal sequences.

* * * * *

UNITED STATES PATENT AND TRADEMARK OFFICE
CERTIFICATE OF CORRECTION

PATENT NO. : 4,048,620
DATED : September 13, 1977
INVENTOR(S) : Richard E. Crandall and Denny E. Morgan It is certified that error appears in the above-identified patent and that said Letters Patent are hereby corrected as shown below:

Column 1, line 37, change "relativey" to --relatively--.

Column 1, line 62, change "reliablity" to --reliability--.

Column 2, line 65, "acccording" should be --according--.

Column 5, between lines 37 and 38, the following paragraph should be inserted:

--The multiple-level signals shown in FIG. 3 represent the address of the selected point in a binary-coded decimal digit format. Each pulse represents and is identifiable with a portion of the address signal. Each pulse carries information necessary to complete the addressing step and carries the information independent of the other pulses of the address signal, that is, the function and meaning of each pulse is independent of the other pulses in the address signal.--

Column 6, line 20 change "(+10)" to --(-10)--.

Column 6, line 46, after "82" insert --and--.

Column 7, line 3, "procesor" should be --processor--.

Column 7, line 30, "selector" should be --selected--.

UNITED STATES PATENT AND TRADEMARK OFFICE
CERTIFICATE OF CORRECTION

PATENT NO. : 4,048,620
DATED : September 13, 1977
INVENTOR(S) : Richard E. Crandall and Denny E. Morgan It is certified that error appears in the above-identified patent and that said Letters Patent are hereby corrected as shown below:

Column 7, line 54, "preformed" should be --performed--.

Column 8, line 17, "abnormmal" should be --abnormal--.

Column 9, line 65, "ilustrated" should be --illustrated--.

Column 13, lines 23 and 24, "applied" should be --applies--.

Column 17, line 8, "diffferent" should be --different--.

Column 17, line 26, change "according to claim 11" to --according to claim 10--.

Column 18, line 43, "providing" should be --producing--.

Signed and Sealed this

Eighth Day of August 1978

[SEAL]

Attest:

RUTH C. MASON
*Attesting Officer*

DONALD W. BANNER
*Commissioner of Patents and Trademarks*